United States Patent
Starostin et al.

(10) Patent No.: US 10,234,315 B2
(45) Date of Patent: Mar. 19, 2019

(54) METHOD FOR DETERMINING FLOW RATES OF PHASES OF A TWO-PHASE MIXTURE IN A PIPELINE

(71) Applicant: SCHLUMBERGER TECHNOLOGY CORPORATION, Sugar Land, TX (US)

(72) Inventors: Alexander Borisovich Starostin, Abingdon (GB); Pavel Evgenievich Spesivtsev, Moscow (RU); Natalya Anatolievna Lebedeva, Nefteyugansk (RU)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 15/298,885

(22) Filed: Oct. 20, 2016

(65) Prior Publication Data

US 2017/0167905 A1 Jun. 15, 2017

(30) Foreign Application Priority Data

Oct. 20, 2015 (RU) ................................ 2015144875

(51) Int. Cl.
*G01F 1/72* (2006.01)
*G01F 1/74* (2006.01)

(52) U.S. Cl.
CPC . *G01F 1/72* (2013.01); *G01F 1/74* (2013.01)

(58) Field of Classification Search
CPC ........................................................ G01F 1/74
USPC ....................................................... 73/861.04
See application file for complete search history.

(56) References Cited

U.S. PATENT DOCUMENTS

| | | | | |
|---|---|---|---|---|
| 5,007,293 A | * | 4/1991 | Jung | G01F 15/08 73/200 |
| 5,600,073 A | * | 2/1997 | Hill | G01B 5/28 73/30.03 |
| 5,604,316 A | * | 2/1997 | Alonso | G01F 1/74 73/861.04 |
| 5,741,978 A | * | 4/1998 | Gudmundsson | G01F 1/36 73/861.04 |

(Continued)

FOREIGN PATENT DOCUMENTS

| | | |
|---|---|---|
| CA | 2573665 A1 | 1/2006 |
| EP | 0684458 A2 | 11/1995 |

(Continued)

OTHER PUBLICATIONS

De Henau, V. et al., "A study of terrain-induced slugging in two-phase flow pipelines", International Journal of Multiphase Flow, 1995, 21(3), pp. 365-379.

(Continued)

*Primary Examiner* — Jewel V Dowtin

(57) ABSTRACT

The disclosure relates to measurements of parameters of multiphase mixtures transported in pipelines. For determining phases flow rates of a two-phase mixture an unsteady pulsed flow regime of the mixture is formed in a pipeline to provide pulsating outbursts of a liquid phase at an outlet of the pipeline. Upon establishment of the pulsed flow regime at the pipeline outlet parameters of the liquid phase outbursts are measured and the flow rates of the phases are determined based on the measured parameters of the liquid phase outbursts.

5 Claims, 3 Drawing Sheets

(56) References Cited

U.S. PATENT DOCUMENTS

| | | | | |
|---|---|---|---|---|
| 6,601,458 B1* | 8/2003 | Gysling | ................. | G01F 1/74 |
| | | | | 73/861.04 |
| 2007/0006640 A1* | 1/2007 | Gysling | ................. | G01F 1/36 |
| | | | | 73/61.44 |
| 2015/0300859 A1* | 10/2015 | Khulief | ................. | G01F 1/74 |
| | | | | 73/861.04 |

FOREIGN PATENT DOCUMENTS

| | | |
|---|---|---|
| EP | 1348065 A1 | 10/2003 |
| GB | 2422016 A | 7/2006 |
| WO | WO2000000715 A1 | 1/2000 |
| WO | WO2012101133 A2 | 8/2012 |

OTHER PUBLICATIONS

Osiptsov, A. A. et al., "Justification of the Drift-Flux Model for Two-Phase Flow in a Circular Pipe", Fluid Dynamics, 2014, 49(5), pp. 614-626.

Malekzadeh, R., "Severe Slugging in a Long Pipeline-Riser System: Experiments and Predictions", International Journal of Multiphase Flow, 46 (2012), pp. 9-21.

* cited by examiner

METHOD FOR DETERMINING FLOW RATES OF PHASES OF A TWO-PHASE MIXTURE IN A PIPELINE

CROSS-REFERENCE TO RELATED APPLICATION

This application claims priority to Russian Application No. 2015144875 filed Oct. 20, 2015, which is incorporated herein by reference in its entirety.

BACKGROUND

The disclosure relates to measurements of parameters of multiphase mixtures transported in pipelines.

Measurement of flow parameters of a multiphase medium is of great interest for optimization of transport of fluids. Generally, the process of measuring phases flow rates is complicated by the lack of information on the structure of the flow, a shape of an inter-phase boundary, and by a sensitivity of densities to pressure gradients and other factors.

There are various methods for measuring parameters of fluids in a pipeline. GB 2422016 describes a method for visual determination of parameters of a multiple phase flow. Another series of patents deals with flow meters comprising a pressure meter and optical sensors installed in special points of a pipe (see e.g. EP 0684450' CA 2573665, WO 2012101139). The inventions are based on the assumption that the flow inside a pipe segment is steady. However, the flow rates in multiphase flows often exhibit pulsations. There are several approaches to stabilize multiphase flows. EP 1348065 teaches suppression of oscillations along with measurements of flow rates of a multiphase flow and computer simulation.

SUMMARY

The disclosure provides precise measurement of phases flow rates in a two-phase mixture in a pipeline without any devices mounted inside the pipeline. In addition, the present method ensures the reliability and efficiency of determining the phases flow rates since the method can be implemented with only accurate measurement of time periods and volume of fluid.

The disclosed method comprises forming an unsteady pulsed flow regime of a multiphase mixture in a pipeline to provide pulsating outbursts of a liquid phase at an outlet of the pipeline. Upon establishment of the pulsed flow regime at the pipeline outlet parameters of the liquid phase outbursts are measured and the flow rates of the phases are determined from the measured parameters of the liquid phase outbursts.

The pulsed flow regime in the pipeline can be provided by mounting at the pipeline outlet a supplementary pipe comprising at least one inclined segment, an angle of inclination of which ensures the formation of the unsteady pulsed flow regime. The angle of inclination of the segment can be from 5 to 70 degrees. Additionally, pressure in the supplementary pipe may be regulated.

To regulate the pressure a gas phase accumulation tank can be connected to the supplementary pipe between the pipeline outlet and the inclined segment, the tank being arranged above the pipe and adapted to change its volume.

BRIEF DESCRIPTION OF DRAWINGS

The disclosure is illustrated by the drawings, where.

DETAILED DESCRIPTION

The disclosed method for measuring flow rates of phases of a two-phase mixture at a steady flow in a pipeline is based on forming a special pulsed flow regime in the pipeline, measuring pulse parameters and interpreting the measurements to obtain values of the flow rates. The required pulses regime is a flow, in which periodic outbursts of one of the phases are observed at a pipeline outlet. The flow can occur in a pipeline having descending and ascending bends, and such flow is referred to as a "plug" flow because it is associated with periodically overlapping a pipe space by a heavy liquid phase in lower regions of the pipeline. The plug flow can also occur in near-horizontal unshaped pipelines, but in this case, the physical mechanism of occurrence of the regime is different and is associated with the development of instability of the interface of stratified flow.

For formation of a periodic flow one of the phases should be sufficiently compressible (generally it is gas). As the result of a heavy phase plug formation a light compressible phase accumulates in front of the heavy phase and then pushes it out. In this case periodic outbursts of the heavy phase are generated at the pipeline outlet. Examples of this kind of flow are known from experiments and simulations, see e.g. Malekzadeh, R., Henkes, R. A. W. M., Mudde, R. F. Severe Slugging in Large-Scale Pipeline-Riser Systems: Experiments and Modelling. Int. J. of Multiphase Flow, 2012, 46, 32-37, or Osiptsov, A. A., Sinkov, K. F., Spesivtsev, P. E., Justification of the drift-flux model for two-phase flow in a circular pipe. Fluid Dynamics, 2014, 49(5), 614-626.

The method can be carried out as follows.

Figure 1:
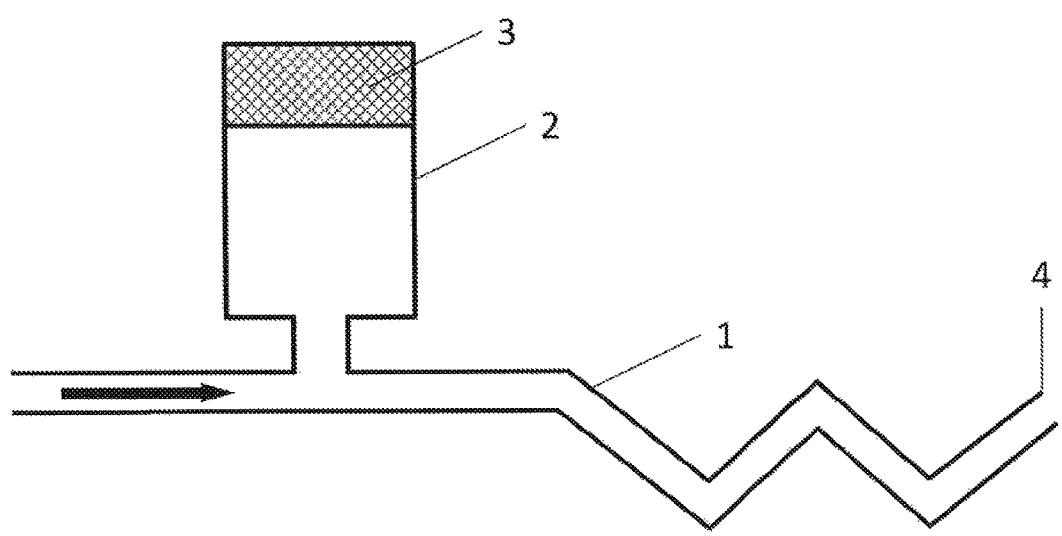
FIG. 1 shows a schematic diagram of the device.

As shown in FIG. 1, to form in a pipeline an unsteady pulsed flow regime of a two-phase mixture, which provides pulsating outbursts of a liquid phase at an outlet of the pipeline, a device is mounted at the end of the pipeline, the device comprises a supplementary pipe 1 having at least one inclined segment. The total length of the pipe 1 can be several meters. The segments are inclined so that to transform the steady flow entering the pipe into an unsteady pulsed flow. Angles of inclination of the pipe segments can range from 5 to 70 degrees and depend on properties of the phases. Outside of this range of angles of inclination the desired plug flow regime is not always possible. Configuration of the pipe is determined on the basis of properties of the liquid phase so that to form a stable pulsed flow.

The supplementary pipe 1 may be provided with a tank 2, into which a volume regulator 3 is inserted. The outlet end of the supplementary pipe 4 is open into a space with a constant pressure (e.g. atmospheric).

As a result of multiphase mixture flow in the supplementary pipe 1 a periodic pulsed flow with liquid phase outbursts is formed at the outlet 4. Examples of such flow are shown in FIG. 2. The liquid phase emerges in pulses, the characteristics of which are to be measured.

The next step is to wait for establishment of an unsteady pulsed flow regime (approximately for 150 seconds). Measurements can be started only after the disturbance caused by installation of the device has been damped and a pulsating nature of the flow has established at the pipeline outlet. Appearance of the pulsating nature of the flow at the outlet of the pipeline depends directly on the presence of a sufficiently compressible phase in the multiphase mixture (compressibility of about $10^{-6}$-$10^{-4}$ $Pa^{-1}$). Then the device can be used to determine the flow rates of phases of the mixture.

To achieve a sustainable pulsed character of the mixture flow a tank 2 can be connected to the supplementary pipe 1 between the pipeline outlet and the inclined segment (or the first inclined segment, if there a plurality of segments), the tank being arranged above the pipe and intended to accumulate gas phase (FIG. 1). The tank 2 is a reservoir having a maximum volume equal approximately to the volume of the supplementary pipe connected to the pipeline outlet, and comprises a built-in volume regulator 3, such as e.g. a piston. Variation of the volume of the tank 2 allows regulation of gas pressure and thereby control of pressure in the supplementary pipe: the pressure rise is the slower, the greater is the established volume of the tank 2. The pressure in turn affects the frequency of outbursts of liquid phase.

Then measurements of outbursts (pulses) of the liquid phase at the outlet are carried out. All possible characteristics can be measured, such as a duration of an outburst period, a volume and a weight of fluid discharged during the outburst period, pressure, etc. To measure the volume and the weight, the liquid phase can be collected in a separate tank at the exit (not shown in FIG. 1). It is necessary to measure at least the duration of outburst periods. Other measurements are optional and can be used for supplementary control of the results.

The obtained measurements are interpreted to obtain values of the phases flow rates. To do this, interpolation of data obtained as a result of mathematical simulation is used. So, simulated is a gas-liquid flow in a pipe similar to that used for the measurements. As a result of simulations for a wide range of flow rates the durations of outburst periods, volume and weight of fluid discharged for a period, pressure etc. are determined. The resulting data is then used to determine to which flow rate the parameters obtained during field measurements correspond.

Figure 2A:
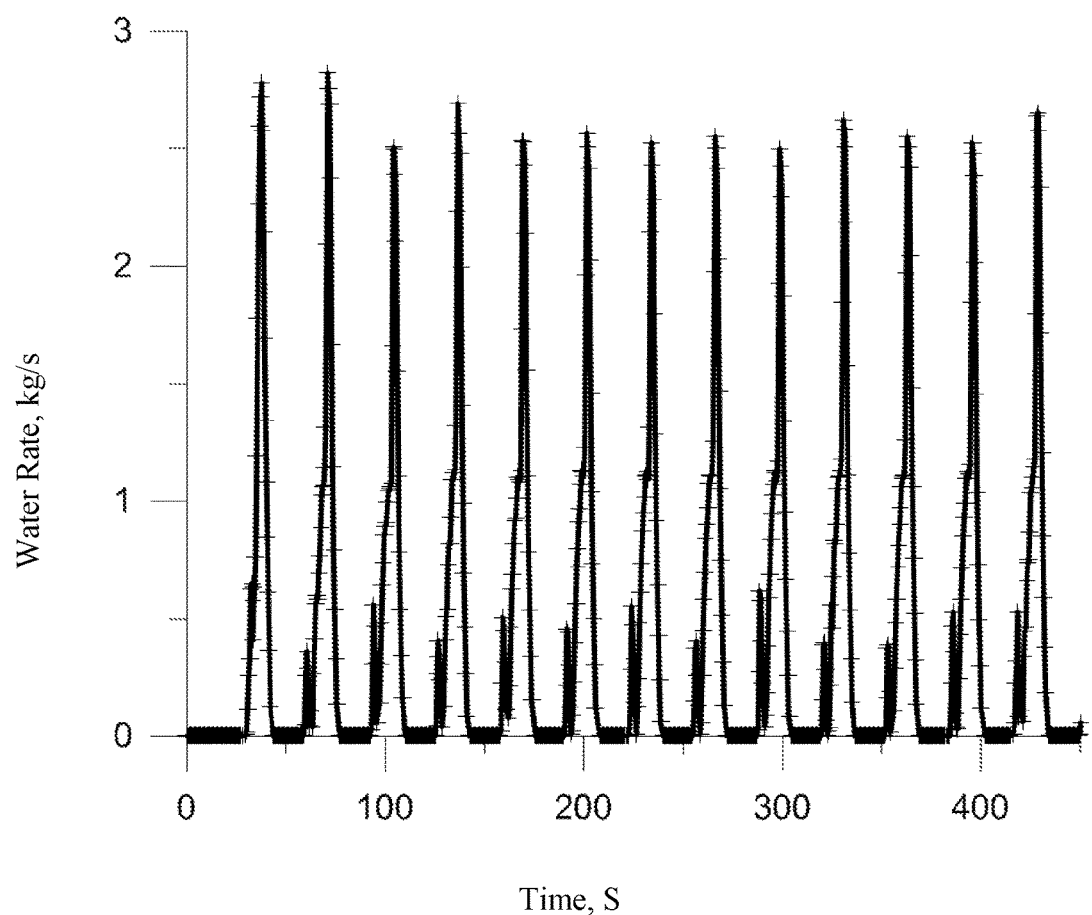
FIG. 2a shows a flow rate of water at the outlet of the device in one of the experiments.
Figure 2B:
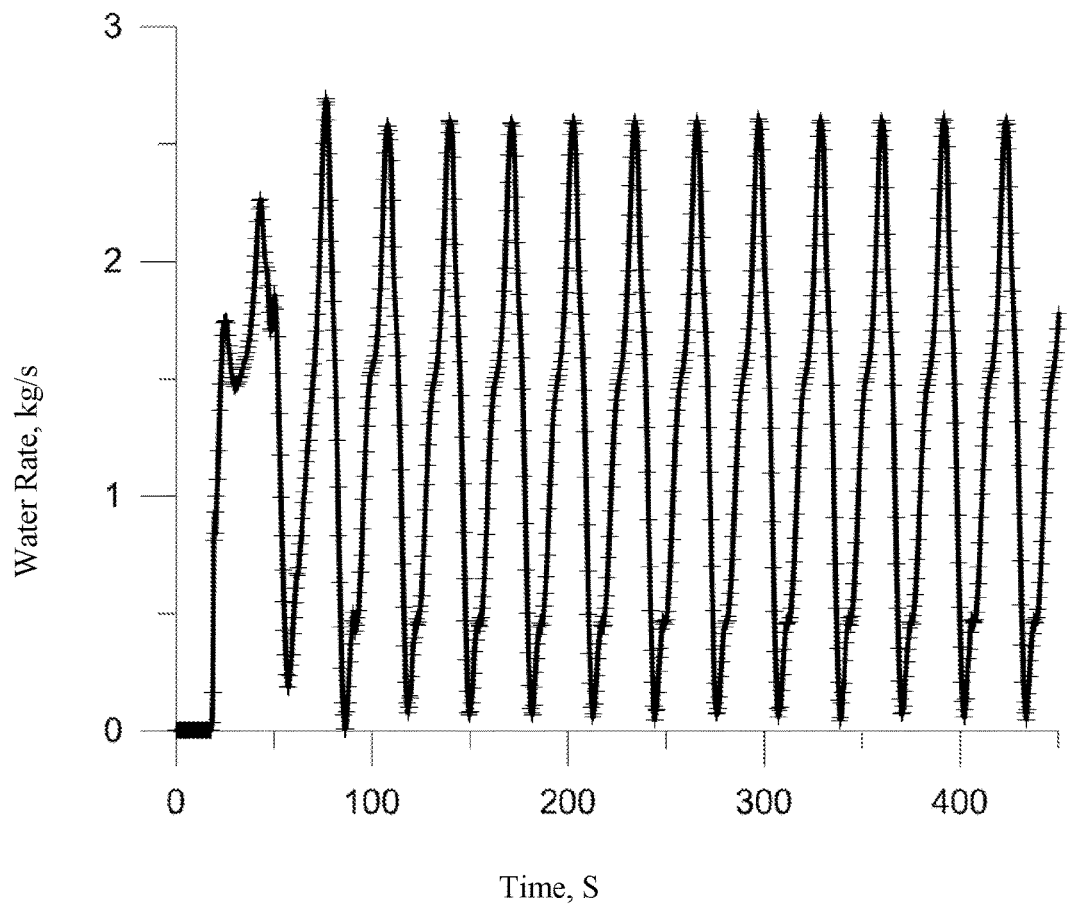
FIG. 2b shows a flow rate of water at the outlet of the device in another experiment.

FIG. 2*a* and FIG. 2*b* shows examples of numerical simulation of a flow of water and air using the device shown in FIG. 1. The supplementary pipe had the diameter of 51.8 mm and the total length of 62.8 meters and consisted of four segments of equal length with span angles of about 50 degrees between the segments. In the example durations of outburst periods were measured. Based on numerical simulations of the flow in this configuration for different flow rates of fluids a table was composed, which shows values of outburst periods and respective values of the flow rates of phases. FIGS. 2*a* and 2*b* show values of liquid phase flow rates in experiments No. 10 and No. 9, respectively. Thus, flow rates of the phases can be determined for the selected design of the device and the gas-liquid mixture based on the period duration.

| Experiment No. | Period, s | Reduced flow rate of water, m/s | Reduced flow rate of air, m/s |
|---|---|---|---|
| 1 | 20 | 0.8 | 0.8 |
| 2 | 21.3 | 0.8 | 0.6 |
| 3 | 23.6 | 0.6 | 0.8 |
| 4 | 23.9 | 0.8 | 0.4 |
| 5 | 25 | 0.2 | 0.8 |
| 6 | 26.4 | 0.4 | 0.8 |
| 7 | 26.4 | 0.6 | 0.6 |
| 8 | 31.3 | 0.4 | 0.6 |
| 9 | 31.5 | 0.6 | 0.4 |
| 10 | 32.6 | 0.2 | 0.6 |
| 11 | 39.3 | 0.4 | 0.4 |
| 12 | 48.4 | 0.2 | 0.4 |

The invention claimed is:

1. A method for determining flow rates of phases of a two-phase mixture in a pipeline, the method comprising:

mounting at an outlet of the pipeline a supplementary pipe comprising at least one inclined segment, an angle of inclination of the inclined segment ensuring formation of an unsteady pulsed flow regime of the two-phase mixture in the pipeline providing pulsating outbursts of a liquid phase of the two-phase mixture at an outlet of the supplementary pipe, upon establishment of the pulsed flow regime of the two-phase mixture at the outlet of the supplementary pipe, measuring durations of periods of the liquid phase outbursts, and determining the flow rates of the phases based on the measured durations of periods of the liquid phase outbursts.

2. The method of claim 1, wherein the angle of inclination of the inclined segment is from 5 to 70 degrees.

3. The method of claim 1, further comprising regulation of pressure in the supplementary pipe.

4. The method of claim 3, wherein to regulate pressure a tank for accumulation of a gas phase is connected to the supplementary pipe between the pipeline outlet and the inclined segment, said tank being disposed above the supplementary pipe and adapted to change its volume.

5. The method of claim 1, wherein a volume and a weight of a fluid discharged during the periods of the liquid phase outbursts are additionally measured.

* * * * *